United States Patent
Oertel et al.

[11] Patent Number: 5,939,643
[45] Date of Patent: Aug. 17, 1999

[54] VORTEX FLOW SENSOR WITH A CYLINDRICAL BLUFF BODY HAVING ROUGHNED SURFACE

[75] Inventors: Herbert Oertel, Ettlingen; Frank Ohle, Steinen, both of Germany

[73] Assignee: Endress + Hauser Flowtec AG, Reinach, Switzerland

[21] Appl. No.: 08/907,695

[22] Filed: Aug. 8, 1997

Related U.S. Application Data

[60] Provisional application No. 60/024,817, Aug. 28, 1996.

[30] Foreign Application Priority Data

| Aug. 21, 1996 | [EP] | European Pat. Off. | 96113383 |
| Jul. 22, 1997 | [EP] | European Pat. Off. | 97810520 |

[51] Int. Cl.$^6$ ........................................ G01F 1/32
[52] U.S. Cl. ........................................ 73/861.22
[58] Field of Search ............... 73/861.21, 861.22, 73/861.24, 198, 861.23

[56] References Cited

U.S. PATENT DOCUMENTS

| 3,720,104 | 3/1973 | Zanker . | |
| 3,863,500 | 2/1975 | Yamasaki et al. | 73/861.22 |
| 4,418,578 | 12/1983 | Blechinger | 73/861.22 |
| 4,995,269 | 2/1991 | Mon | 73/861.22 |

FOREIGN PATENT DOCUMENTS

| 2 041 178 | 8/1970 | Germany . |
| 8-5419 | 1/1996 | Japan . |
| 2 082 322 | 3/1982 | United Kingdom . |

*Primary Examiner*—Harshad Patel
*Attorney, Agent, or Firm*—Bose McKinney & Evans

[57] ABSTRACT

To increase in the accuracy of vortex flow sensors measuring the flow velocity and/or the volumetric flow rate of a fluid flowing through a measuring tube, the vortex flow sensor comprises a cylindrical bluff body of circular section mounted in the measuring tube. The bluff body has a surface which is roughened. A single vortex-sensing element is responsive to pressure fluctuations caused by the vortices. The roughness can be realized by shallow depressions being identical in shape and either evenly or unevenly, particularly stochastically, distributed over the surface of the bluff body. The depressions can be only provided in a sector of the surface whose central angle is less than 180°. The bluff body can be connected at its respective ends, along its circumference, with a pedestal fixed to the inner surface of the measuring tube, or the the bluff body is provided at its respective ends with a constricted cylindrical end portion which is connected along its circumference with the inner surface of the measuring tube.

9 Claims, 2 Drawing Sheets

5,939,643

VORTEX FLOW SENSOR WITH A CYLINDRICAL BLUFF BODY HAVING ROUGHNED SURFACE

This Appln. claims benefit of Provisional Appln. No. 60/024,817 filed Aug. 28, 1996.

FIELD OF THE INVENTION

The present invention relates to a vortex flow sensor for measuring the flow velocity and/or the volumetric flow rate of a fluid flowing through a measuring tube, said vortex flow sensor comprising a cylindrical bluff body mounted in the measuring tube.

BACKGROUND OF THE INVENTION

During operation of such a vortex flow sensor, a Kármán vortex street is formed downstream of the bluff body. Its pressure fluctuations are converted by a vortex-sensing element into an electric signal whose frequency is proportional to the volumetric flow rate.

Cylindrical bluff bodies in vortex flow sensors were already described and investigated in the early days of such sensors, as shown in U.S. Pat. No. 3,720,104, for example. However, the technical development turned away from cylindrical bluff bodies toward triangular and trapezoidal ones, probably because the measurement accuracy attainable with the former was too low.

Only recently has the cylindrical bluff body been taken up again, as shown in JP-A 8-5419 with English abstract, which describes a vortex flow sensor for measuring the flow velocity and/or the volumetric flow rate of a fluid flowing through a measuring tube, said vortex flow sensor comprising:

a cylindrical bluff body of circular section mounted in the measuring tube and having a smooth surface;

three parallel through bores evenly distributed over the height of the bluff body, whose respective axes are parallel to the direction of flow; and five vortex-sensing elements, three of which are mounted in the bluff body and are each connected with a respective one of the through bores, while the two others are mounted opposite each other at the surface of the bluff body along an axis perpendicular to the direction of flow and to the longitudinal axis of the bluff body.

The purpose of this design is, on the one hand, to increase the measurement accuracy at low flow velocities by averaging the signals from the three vortex-sensing elements mounted in the bluff body and, on the other hand, to utilize the signals from the two vortex-sensing elements positioned at the surface of the bluff body at high flow velocities, thus permitting measurements over a wide flow-velocity range.

SUMMARY OF THE INVENTION

Bores in the bluff body involve the risk that, because of their small lumen, substances contained in the fluid deposit in the bores. These deposits may, in the course of time, result in the bores becoming clogged. This is particularly disadvantageous if, as in the prior art arrangement described in JP-A 8-5419, vortex-sensing elements are connected with the bores.

It is an object of the invention to achieve an increase in the accuracy of vortex flow sensors comprising cylindrical bluff bodies by other means than those described in the prior art, with the number of vortex-sensoring elements required being smaller than that in the prior art.

To attain this object, the invention provides a vortex flow sensor for measuring the flow velocity and/or the volumetric flow rate of a fluid flowing through a measuring tube, said vortex flow sensor comprising:

a cylindrical bluff body of circular section mounted in the measuring tube and having a surface which is, at least in part, roughened; and a single vortex-sensing element responsive to pressure fluctuations caused by the vortices.

In a first preferred embodiment of the invention, the surface of the bluff body is provided with shallow depressions.

In a second preferred embodiment of the invention, the shallow depressions are identical in shape and are evenly distributed over the surface of the bluff body.

In a third preferred embodiment of the invention, the shallow depressions are identical in shape and are unevenly, particularly stochastically, distributed over the surface of the bluff body.

In a fourth preferred embodiment of the invention, the shallow depressions are only provided on that side of the bluff body against which the fluid flows in operation.

According to a development of this preferred embodiment, the shallow depressions are only provided in a sector of the surface whose central angle is less than 180°.

According to a first development of the invention, the bluff body is permanently connected at its respective ends, along its circumference with the inner surface of the measuring tube.

According to a second development of the invention, the bluff body is connected at its respective ends, along its circumference, with a pedestal fixed to the inner surface of the measuring tube.

According to a third development of the invention, the bluff body is provided at its respective ends with a constricted cylindrical end portion which is connected along its circumference with the inner surface of the measuring tube.

BRIEF DESCRIPTION OF THE DRAWINGS

The invention and further advantages will become more apparent from the following description of embodiments when taken in conjunction with the accompanying drawings, in which.

DETAILED DESCRIPTION OF THE DRAWINGS

Figure 1:
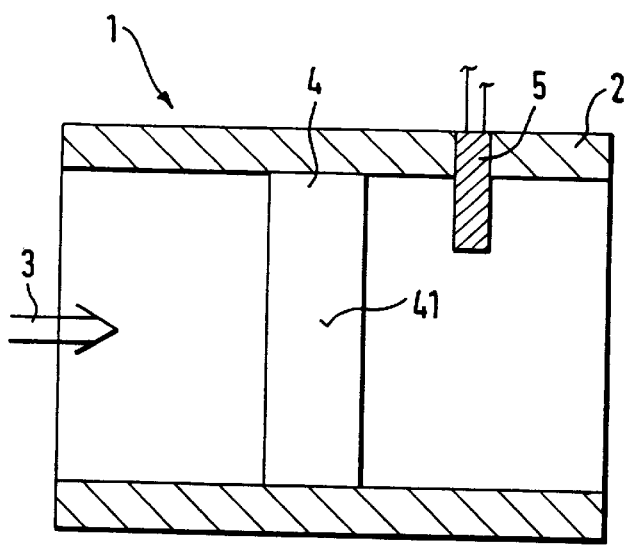
FIG. 1 a schematic longitudinal section of a vortex flow sensor with a cylindrical bluff body.

Referring to FIG. 1, an embodiment of a vortex flow sensor 1 is shown in a schematic longitudinal section. It comprises a measuring tube 2, through which a fluid to be measured, e.g., a liquid, a gas, or a vapor, particularly water vapor, flows in a predetermined direction, as indicated by arrow 3.

In the measuring tube 2 a bluff body 4 is fixed, particularly by being welded to the inner surface of the measuring tube. The bluff body 4 serves to generate Kármán vortices and is cylindrical. It is circular in section, and according to the invention, its surface 41 is roughened, i.e., it has a predeterminable roughness. The latter is not yet shown in FIG. 1 to simplify the illustration.

In the embodiment of FIG. 1, a vortex-sensing element 5, which is responsive to vortex-induced pressure fluctuations in the fluid, is mounted in the wall of the measuring tube 2 downstream of the bluff body 4. For the vortex-sensing element 5, any of the conventional types of electromechanical transducers used in vortex flow sensors can be employed, such as capacitive, piezoelectric, or inductive, particularly electrodynamic, transducers.

Instead of placing the vortex-sensing element 5 downstream of the bluff body 4, it may be positioned at the surface 41, and particularly sealingly flush-fitted therein, with the electric leads of the vortex-sensing element passing through a hole in the bluff body which is not connected with the fluid.

The roughness of the surface 41 can be produced during manufacture by, e.g., grinding with an abrasive whose grain size can be chosen in accordance with the desired coefficient of roughness.

Figure 2:
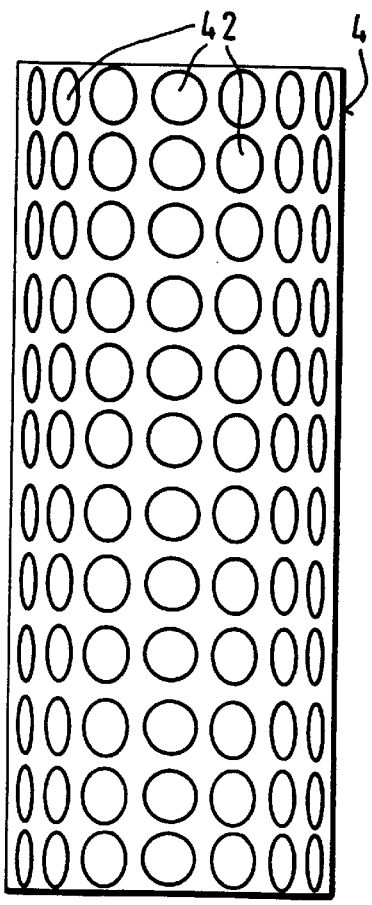
FIG. 2 is a schematic side view of the cylindrical surface of the bluff body with evenly distributed shallow depressions to roughen the surface.

FIG. 2 shows a preferred embodiment of the type of roughness of the surface 41 of the cylindrical bluff body: The surface 41 is fully covered with shallow depressions 42. These are preferably identical in shape and are evenly distributed over the surface 41 without touching each other or interfusing.

Figure 3:
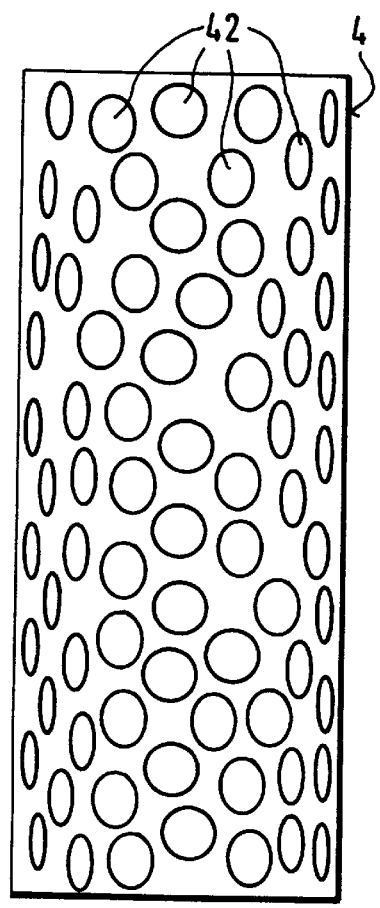
FIG. 3 is a schematic side view of the cylindrical surface of the bluff body with unevenly distributed shallow depressions to roughen the surface.

FIG. 3 shows another preferred embodiment of the type of roughness of the surface 41 of the cylindrical bluff body: Here, the surface 41 is fully covered with shallow depressions 42 which are also identical in shape, but which are unevenly distributed over the surface 41. They do not touch or interfuse, either. Particularly advantageously, the depressions are distributed stochastically in this case.

Figure 4:
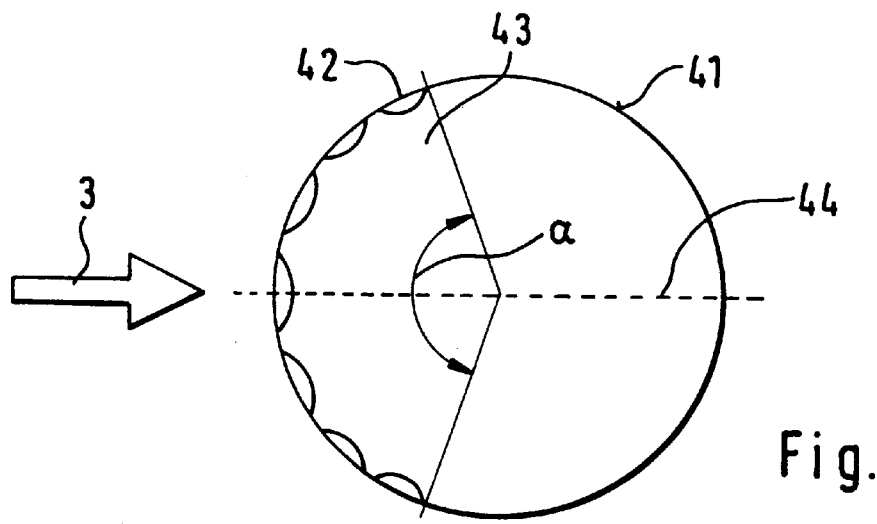
FIG. 4 is a schematic cross section of the bluff body with the shallow depressions on only part of the cylindrical surface.

As FIG. 4 shows, it is not necessary for the depressions 42 to cover the entire surface 41. It may be sufficient to provide depressions 42 only on that side of the bluff body 4 against which the fluid flows during operation. In that case, therefore, only the half of the surface which faces the moving fluid will be provided with the depressions.

It may also be sufficient to provide the depressions 42 only in a sector 43 of the surface 41 whose central angle a is less than 180°, in particular about 140° to 160°, and which is symmetrical with respect to a central axis 44 of the fluid flow.

A preferred shape of the depressions is that they are spheric.

The intended increase in the accuracy of vortex flow sensors as stated above is achieved by the depressions explained according to FIGS. 2 to 4 and is based on the following effects:

The location of vortex detachement or shedding on a smooth-surfaced cylindrical bluff body is not constant but fluctuates irregularly. These fluctuations generate variations of the vortex frequency. On the contrary and according to the invention, the roughened surface of the bluff body, in particular its depressions, generate locally defined turbulences which stabilize the vortex detachement or shedding location on the surface of the bluff body. Therefore, the vortices always detach at the same location.

Figure 5:
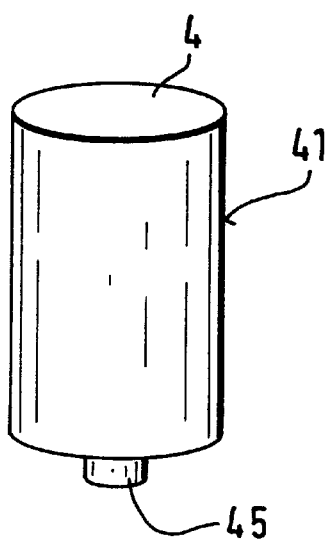
FIG. 5 is a schematic perspective view of a bluff body with a constricted end portion.

FIG. 5 shows a development of the invention in which the bluff body 4 is provided at each of its ends with a respective constricted cylindrical end portion 45, which is connected along its circumference with the inner surface of the measuring tube. To simplify the illustration, only one end portion is shown in FIG. 5, and like in FIG. 1, the depressions in the surface have been omitted.

Figure 6:
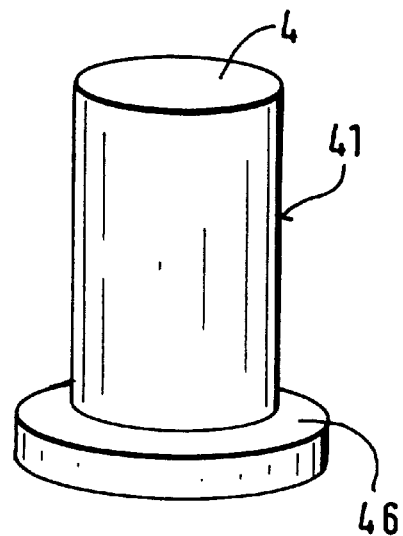
FIG. 6 is a schematic perspective view of a bluff body with a pedestal at one end thereof.

FIG. 6 shows another development of the invention in which the bluff body 4 is connected at each of its ends, along its circumference, with a pedestal 46 to be attached to the inner surface of the measuring tube. To simplify the illustration, only one of the pedestals is shown and the depressions in the surface have again been omitted.

The constricted end portions 45 and the pedestals 46 serve to decouple the part of the flow in the vicinity of the inner surface of the measuring tube from the parts of the flow being nearer to its centre in order to increase the accuracy of the vortex flow sensor. Flow disturbances generated at locations where the bluff body contacts the wall of the measuring tube, and detach there exponentially are not deviated to the centre of the flow but to the wall; therefore, they no longer disturb the vortices used for the mesurement.

We claim:

1. A vortex flow sensor for measuring at least one of the flow velocity and the volumetric flow rate of a fluid flowing through a measuring tube, having an inner surface said vortex flow sensor comprising:

a cylindrical bluff body of circular section mounted in the measuring tube to generate vortices and having a surface which is, at least in part, roughened; and a single vortex-sensing element responsive to pressure fluctuations caused by the vortices.

2. A vortex flow sensor as claimed in claim 1 wherein the surface of the bluff body is provided with shallow depressions.

3. A vortex flow sensor as claimed in claim 2 wherein the shallow depressions are identical in shape and are evenly distributed over the surface of the bluff body.

4. A vortex flow sensor as claimed in claim 2 wherein the shallow depressions are identical in shape and are unevenly, particularly stochastically, distributed over the surface of the bluff body.

5. A vortex flow sensor as claimed in claim 2 wherein the shallow depressions are only provided on that side of the bluff body against which the fluid flows in operation.

6. A vortex flow sensor as claimed in claim 5 wherein the shallow depressions are only provided in a sector of the surface whose central angle is less than 180°.

7. A vortex flow sensor as claimed in claim 1 wherein the bluff body is permanently connected at its respective ends, along its circumference with the inner surface of the measuring tube.

8. A vortex flow sensor as claimed in claim 1 wherein the bluff body is connected at its respective ends, along its circumference, with a pedestal fixed to the inner surface of the measuring tube.

9. A vortex flow sensor as claimed in claim 1 wherein the the bluff body is provided at its respective ends with a constricted cylindrical end portion which is connected along its circumference with the inner surface of the measuring tube.

* * * * *